US008042861B2

(12) United States Patent
Molnar et al.

(10) Patent No.: US 8,042,861 B2
(45) Date of Patent: Oct. 25, 2011

(54) TAILGATE AND MOTOR VEHICLE

(75) Inventors: Bela Molnar, Ehningen (DE); Fred Wölfle, Sindelfingen (DE); Helmut Eck, Rutesheim (DE); Stefan Adams, Pforzheim-Hohenwart (DE); Volker Peitz, Vaihingen/Riet (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 251 days.

(21) Appl. No.: 12/432,789

(22) Filed: Apr. 30, 2009

(65) Prior Publication Data
US 2009/0289467 A1 Nov. 26, 2009

(30) Foreign Application Priority Data
May 21, 2008 (DE) .......................... 10 2008 024 701

(51) Int. Cl.
B60J 9/00 (2006.01)
(52) U.S. Cl. ...................................... 296/154
(58) Field of Classification Search .................. 296/154, 296/180.1, 26.11, 37.6, 57.1; 224/404
See application file for complete search history.

(56) References Cited

U.S. PATENT DOCUMENTS

| | | | | |
|---|---|---|---|---|
| 2,932,370 | A * | 4/1960 | Bruder et al. ................. | 192/219 |
| 4,738,479 | A | 4/1988 | Filtri et al. | |
| 4,756,568 | A * | 7/1988 | Yamamoto et al. ......... | 296/180.1 |
| 4,773,692 | A * | 9/1988 | Schleicher et al. ......... | 296/180.5 |
| 4,810,022 | A * | 3/1989 | Takagi et al. ............... | 296/180.5 |
| 4,854,635 | A * | 8/1989 | Durm et al. ................. | 296/180.5 |
| 4,887,681 | A * | 12/1989 | Durm et al. .................. | 180/68.1 |
| 4,889,382 | A * | 12/1989 | Burst et al. .................. | 296/180.5 |
| 5,141,281 | A * | 8/1992 | Eger et al. ................... | 296/180.5 |
| 5,923,245 | A * | 7/1999 | Klatt et al. .................... | 340/479 |
| 6,139,090 | A * | 10/2000 | Stidd .......................... | 296/180.5 |
| 6,431,639 | B2 * | 8/2002 | Yoon .......................... | 296/180.1 |
| 6,447,050 | B1 * | 9/2002 | Plassmeyer et al. ........ | 296/180.5 |
| 6,540,282 | B2 * | 4/2003 | Pettey ......................... | 296/180.5 |
| 6,926,346 | B1 * | 8/2005 | Wong et al. ................. | 296/180.5 |
| 6,932,016 | B1 * | 8/2005 | Gieseke ........................ | 114/238 |
| 7,201,432 | B2 * | 4/2007 | Roth ........................... | 296/180.5 |
| 7,322,638 | B2 * | 1/2008 | Larson ....................... | 296/180.5 |
| 7,380,871 | B2 * | 6/2008 | Froeschle et al. .......... | 296/180.5 |
| 7,387,330 | B2 * | 6/2008 | Froeschle et al. .......... | 296/180.5 |
| 7,481,482 | B2 * | 1/2009 | Grave et al. ................. | 296/180.5 |
| 7,578,543 | B2 * | 8/2009 | Wegener et al. ............ | 296/180.5 |
| 7,665,796 | B2 * | 2/2010 | Wegener .................... | 296/180.1 |
| 7,770,962 | B1 * | 8/2010 | Maxwell .................... | 296/180.5 |
| 2007/0145776 | A1 | 6/2007 | Grave et al. | |
| 2009/0160215 | A1 * | 6/2009 | Paul et al. ................... | 296/180.5 |
| 2009/0286461 | A1 * | 11/2009 | Molnar et al. ............... | 454/152 |

FOREIGN PATENT DOCUMENTS

| | | |
|---|---|---|
| DE | 8913000 U1 | 12/1989 |
| DE | 9311780 U1 | 10/1993 |
| DE | 10309369 A1 | 9/2004 |
| EP | 0226778 A2 | 7/1987 |
| FR | 2843360 A1 | 2/2004 |

OTHER PUBLICATIONS

German Office Action dated Apr. 8, 2009.

* cited by examiner

Primary Examiner — Kiran B. Patel

(57) ABSTRACT

A tailgate of a motor vehicle has an extensible wind-deflecting device which, in its non-use position, is preferably arranged, so as to lie within an outer contour, in a stowage space. Here, the tailgate is formed substantially from an inner and an outer panel, with a collecting device, which is connected to the inner and to the outer panel and which is arranged in the region of the stowage space, being provided for collecting water which has infiltrated into the stowage space.

22 Claims, 5 Drawing Sheets

TAILGATE AND MOTOR VEHICLE

CROSS-REFERENCE TO RELATED APPLICATION

This application claims the priority, under 35 U.S.C. §119, of German application DE 10 2008 024 701.4, filed May 21, 2008; the prior application is herewith incorporated by reference in its entirety.

BACKGROUND OF THE INVENTION

Field of the Invention

The present invention relates to a tailgate of a motor vehicle having an extensible wind-deflecting device which, in its non-use position, is preferably arranged, so as to lie within an outer contour, in a stowage space. The invention also relates to a motor vehicle fitted with a tailgate of this type.

In motor vehicles, in particular in sports cars, which conventionally have an extensible wind-deflecting device arranged at the rear side in order to improve driving dynamics, the problem often occurs that, in the event of rain, water infiltrates into the tailgate in the region of the wind-deflecting device and can only be removed from there again with difficulty. The water which has infiltrated in this way leads to undesired corrosion if it remains there for a relatively long time, which corrosion can have an adverse effect on the value retention of the motor vehicle in the long term.

German Utility Model DE 93 11 780 U1 discloses a device for discharging water for body flaps of motor vehicles, in which device a collecting container is provided which is arranged on the body flap. The collecting container has a discharge opening on a rear container wall and an inflow opening on a top container wall. A collecting container of this type is arranged for example laterally in the region of a kink in the body of a tailgate, such that the rainwater flowing along the body flap can run into the inflow opening, which is situated in the top container wall, of the collecting container. Since the collecting container has an outflow opening only in the region of its rear container wall, the water collects in the front region of the collecting container when the body flap is pivoted up, and the water can then only run out of the collecting container through the outflow opening once the tailgate is closed. In this way, it is intended in particular to prevent an infiltration of water into a stowage space, which is situated under the tailgate, when the tailgate is open.

German Utility Model DE 89 13 000 U1 discloses a trunk trim panel for a motor vehicle, which trunk trim panel runs in an obliquely inclined fashion from bottom to top in the direction of the vehicle front side and, in the upper region, a rear side of the plate-like trunk trim panel has an angularly tapering lug which is connected to the trunk trim panel at a plurality of points by webs. The aim of this is to make it possible for the trunk trim panel to be easily retrofitted to the rear side of a motor vehicle, with the fastening measures of the trunk trim panel being arranged so as to be hidden, but nevertheless remaining easily accessible from the outside.

SUMMARY OF THE INVENTION

It is accordingly an object of the invention to provide a tailgate and a motor vehicle that overcomes the above-mentioned disadvantages of the prior art devices of this general type, which is characterized in particular by a reduced risk of corrosion to the vehicle body.

With the foregoing and other objects in view there is provided, in accordance with the invention, a tailgate of a motor vehicle having an extensible wind-deflecting device which, in a non-use position, is disposed, so as to lie within an outer contour, in a stowage space. The tailgate contains an inner panel, an outer panel, and a collecting device connected to the inner and outer panels and is disposed in a region of the stowage space. The collecting device is provided for collecting water which has infiltrated into the stowage space.

The invention is based on the general concept of providing, in a tailgate of a motor vehicle having an extensible wind-deflecting device, a collecting device, which is configured in the manner of a water collecting basin, below the wind-deflecting device and within the tailgate, such that water which has infiltrated into the tailgate via the gaps or via the opening generated by the wind-deflecting device when the latter is extended can be collected and discharged in such a manner as to minimize corrosion. Here, the wind-deflecting device, in its non-use position, is preferably arranged, so as to lie within an outer contour, in a stowage space of the tailgate, which stowage space is conventionally situated below a rear window of the motor vehicle and between an outer panel and an inner panel of the tailgate. Here, the collecting device is arranged in the region of the stowage space, specifically in such a way that the collecting device forms a water collecting basin and can thus collect, and discharge in a targeted fashion, the rainwater which has infiltrated through the gaps between the outer panel and the wind-deflecting device. Here, the collecting device is sealingly connected at one side to the inner panel and at the other side to the outer panel, such that it is not possible for water to infiltrate into the tailgate in an uncontrolled fashion. In this way, an inevitable infiltration of water into the tailgate can be channeled, that is to say collected and discharged in a targeted fashion, such that the water cannot pass into regions which are at risk of corrosion and remain there for a relatively long period of time. The collecting device according to the invention therefore permits predefined water management which, by means of the targeted discharge of water which has infiltrated into the stowage space, in particular prevents the formation of corrosion nuclei at locations which are difficult to access and which are therefore at risk of corrosion.

In a further advantageous embodiment of the solution according to the invention, the collecting device is formed from plastic, in particular from high-temperature-resistant plastic. A collecting device of this type which is formed from plastic can be of virtually freely selectable shape, and simultaneously entails a low weight of the collecting device, which is highly advantageous in particular in sports car construction. Furthermore, a collecting device which is formed in this way is cost-effective to produce and can be adapted in a relatively flexible manner to ongoing changes, for example by simply changing the injection mold, as a result of which it is possible to react particularly quickly to any changes to the body.

In a further advantageous refinement of the solution according to the invention, the collecting device is sealingly adhesively bonded in an encircling fashion at least to the outer panel, with the adhesive bond ensuring an elastically sealed connection between the collecting device and the outer panel at least in a temperature range from $-40°\text{ C.}<T<90°\text{ C.}$ The adhesive bond, which remains in its elastic state in the entire temperature range, permits a compensation of different thermal expansions between the collecting device, which is conventionally formed from plastic, and the outer panel of the tailgate, which is conventionally formed from aluminum. Here, the extremely different thermal expansions occur in particular during the painting of the tailgate, during which process high temperatures prevail which simultaneously cause the adhesive bond to be hardened. In general, an adhesive bond of this type permits an elastic and simultaneously sealed connection between the collecting device at one side and the outer panel at the other side at virtually all conceivable subsequent operating temperatures, such that the adhesive bond, that is to say the seal, remains elastic and sealed, and can thereby perform its task in an optimum fashion, preferably over the entire service life of the tailgate.

The collecting device is expediently fixedly connected, in particular riveted by a solid punch rivet, to the outer panel in the region of a bracket. Here, the punch rivet connection may be used to pre-position the collecting device on the outer panel, as a result of which the formation of an adhesive seam between the collecting device and the outer panel can be simplified. Punch rivet connections are also extremely durable and do not harbor the risk of inadvertent detachment, as is the case for example with screw connections.

It is self-evident that the features mentioned above and the features yet to be explained below can be used not only in the respectively specified combination but also in other combinations or individually, without departing from the scope of the present invention.

Other features which are considered as characteristic for the invention are set forth in the appended claims.

Although the invention is illustrated and described herein as embodied in a tailgate and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
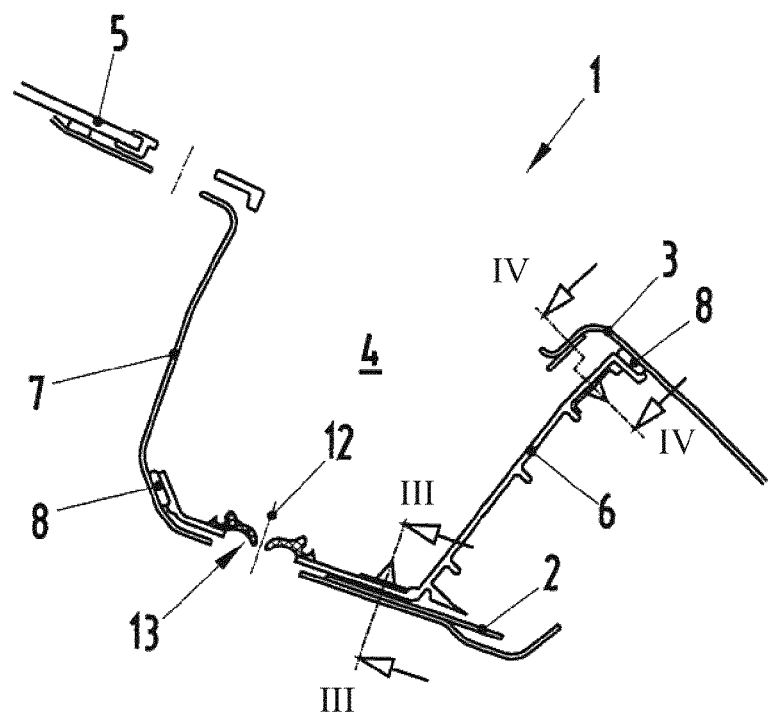
FIG. 1 is a diagrammatic, sectional view through a tailgate in a region of a collecting device according to the invention.
Figure 5:
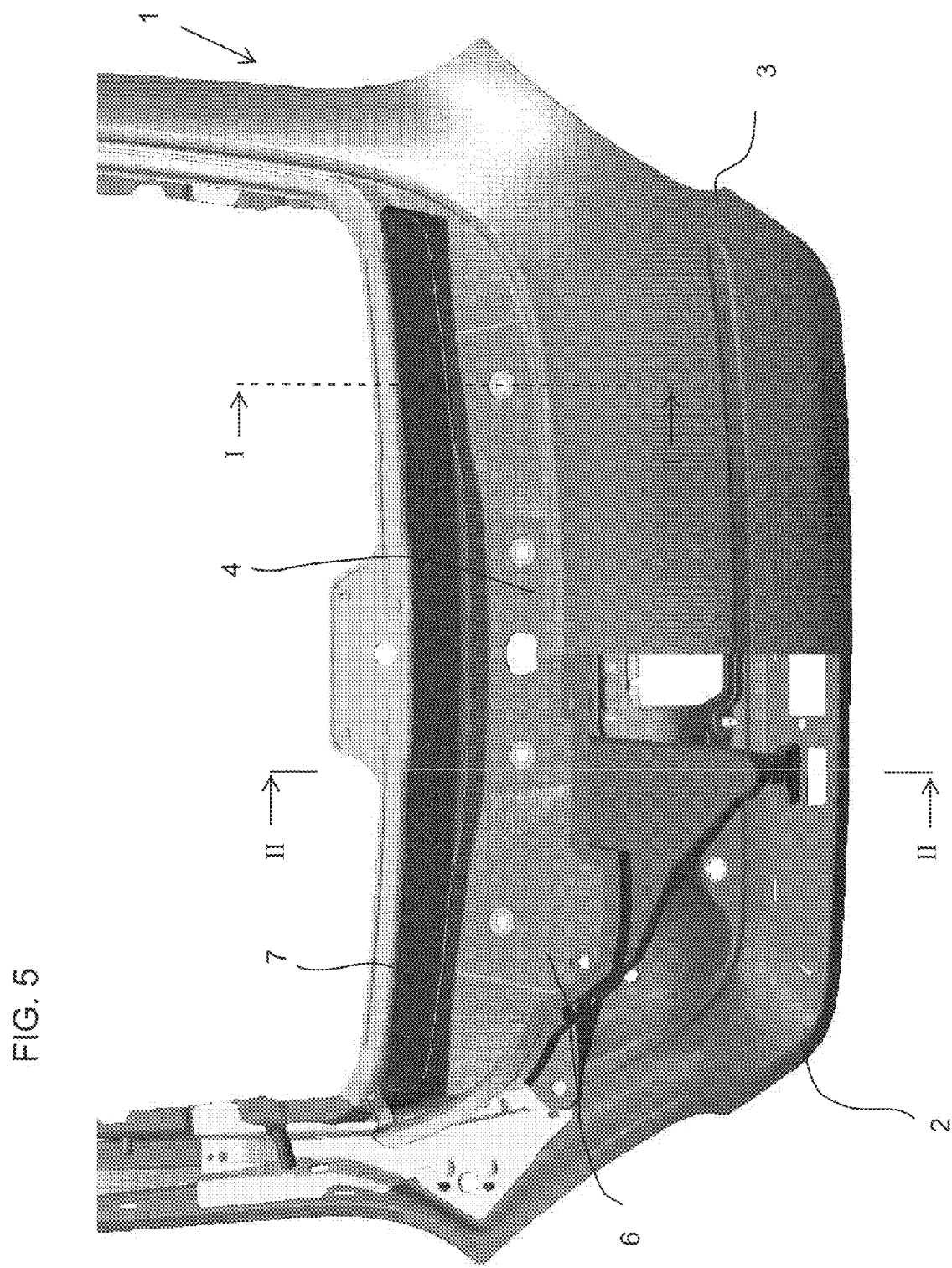
FIG. 5 is a perspective view of the tailgate, in which an outer body panel is removed in the left hand side of the drawing.
Figure 6:
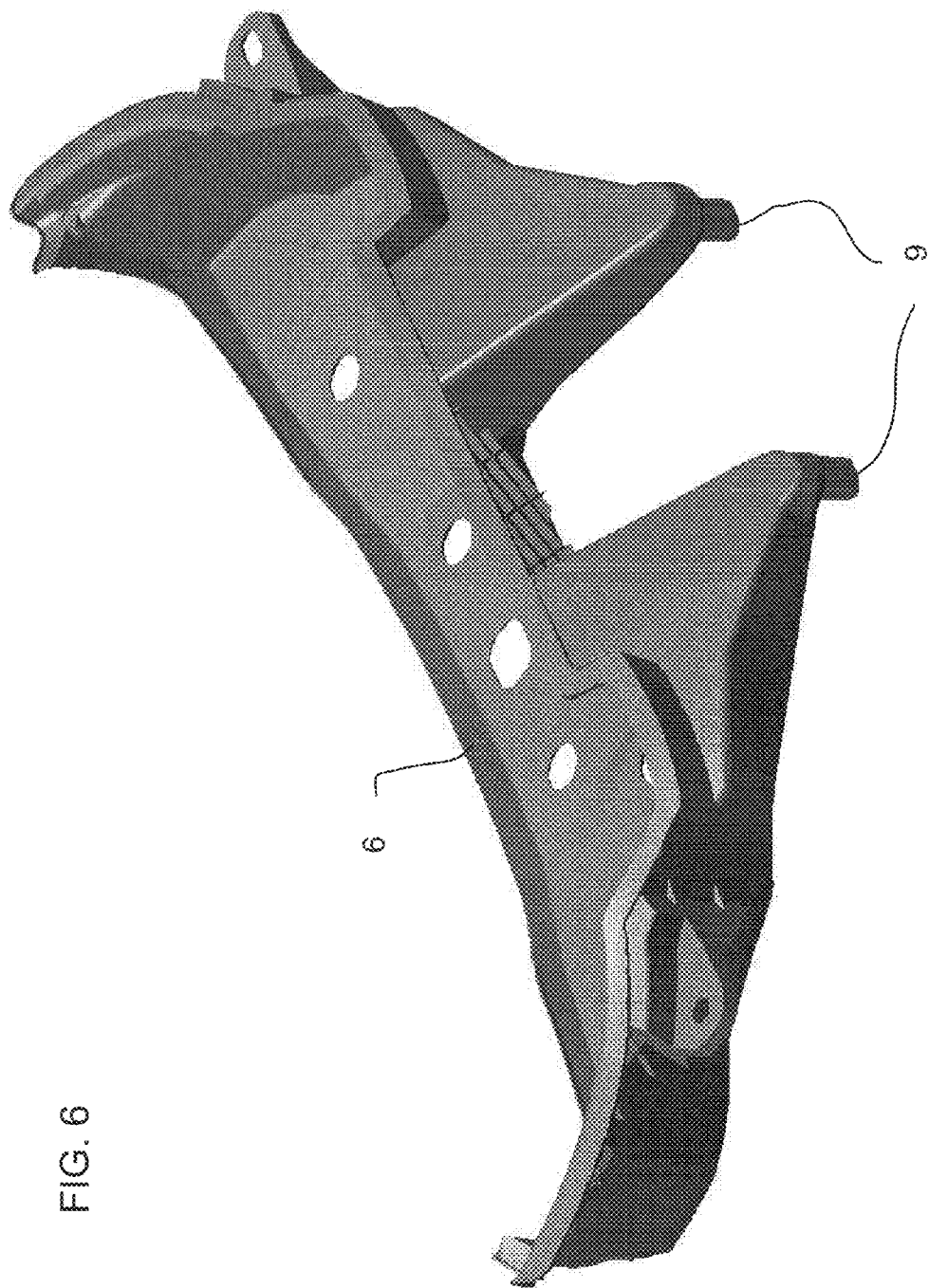
FIG. 6 is a perspective view of a collecting device.
Figure 7:
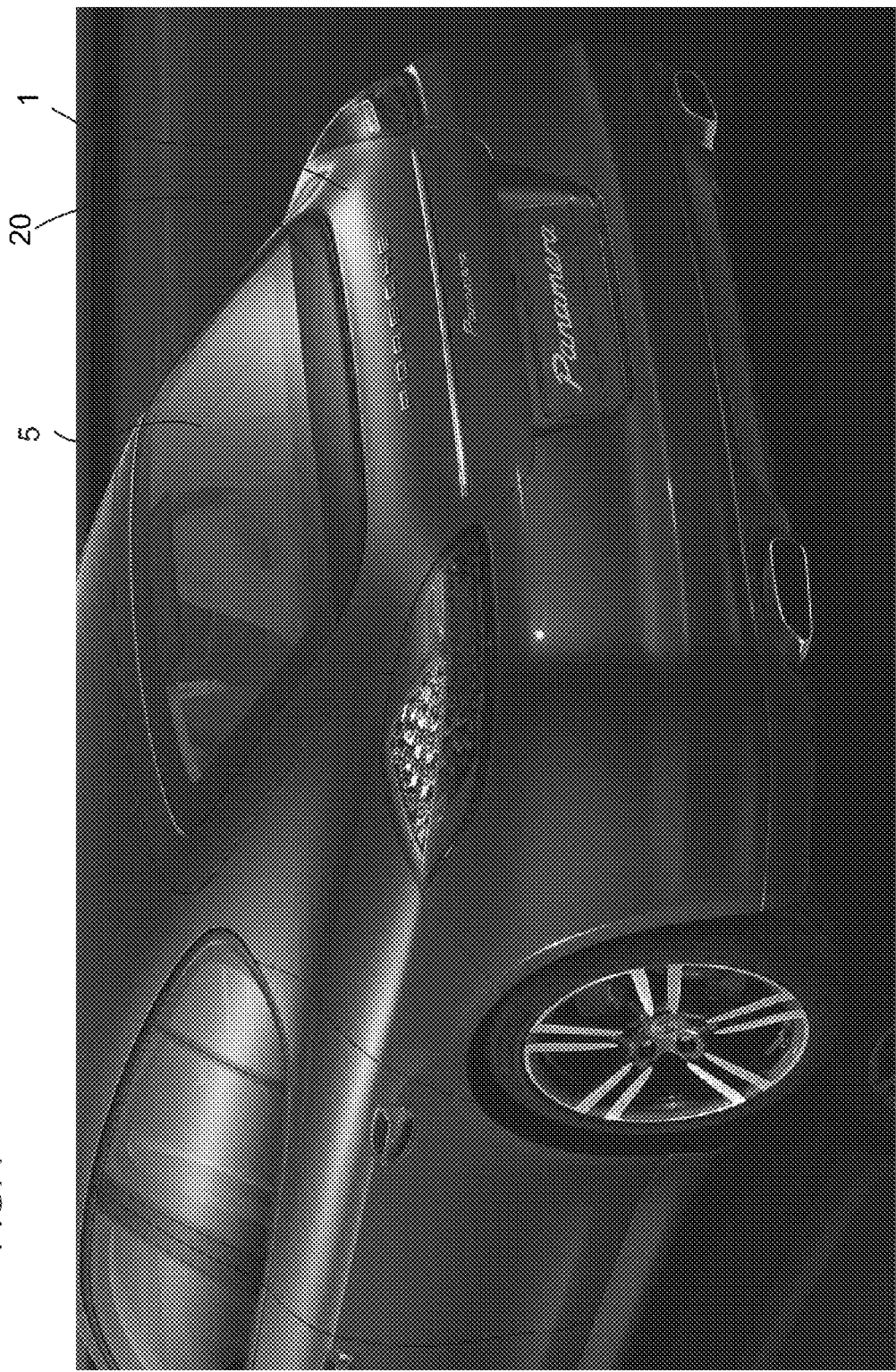
FIG. 7 is a perspective view of an automobile with a wind deflecting device in a non-use position.

Referring now to the figures of the drawing in detail and first, particularly, to FIGS. 1, 5 and 7 thereof, there is shown a tailgate 1 according to the invention of a motor vehicle that has an inner panel 2 and an outer panel 3 which forms an outer contour of the motor vehicle 1. A stowage space 4 is arranged substantially between the inner panel 2 and the outer panel 3, which stowage space 4 serves to hold a wind-deflecting device 20 in its non-use position (see FIG. 7). In its non-use position, the wind-deflecting device 20 is preferably arranged in the stowage space 4 in such a way as to form a continuous outer contour together with the outer panel 3 and a rear window 5 which is arranged above and in front of the outer panel 3 in the direction of travel. According to the invention, a collecting device 6 for collecting water which has infiltrated into the stowage space 4 is now provided, which collecting device 6 is connected to the inner panel 2 and to the outer panel 3 and is arranged in the region of the stowage space 4. Here, the collecting device 6 is of basin-like or trough-like construction and forms, together with a reinforcement element 7, a wall of the stowage space 4. Here, the collecting device 6 is conventionally formed from plastic, in particular from high-temperature-resistant plastic, or from metal, in particular from aluminum or from pressure-die-cast magnesium. FIG. 6 shows a perspective view of just the collecting device 6.

To be able to effectively prevent an infiltration of moisture or water between the collecting device 6 on the one hand and the inner panel 2 or the outer panel 3 on the other hand, the collecting device 6 is sealingly connected in an encircling fashion to the inner panel 2 and to the outer panel 3 by a respective adhesive bond 8, as per FIG. 1. Here, the adhesive bond 8 is configured so as to ensure an elastically sealed connection between the collecting device 6 at one side and the inner panel 2 or outer panel 3 at the other side at least in a temperature range from −40° C.<T<90° C. The expected operating temperature of the motor vehicle which is fitted with the tailgate 1 according to the invention conventionally falls within the temperature range, such that reliable sealing can be ensured by an adhesive bond 8 which is temperature-resistant in this way. According to FIG. 1, the collecting device 6 is additionally connected by the adhesive bond 8 to the reinforcement element 7.

Figure 2:
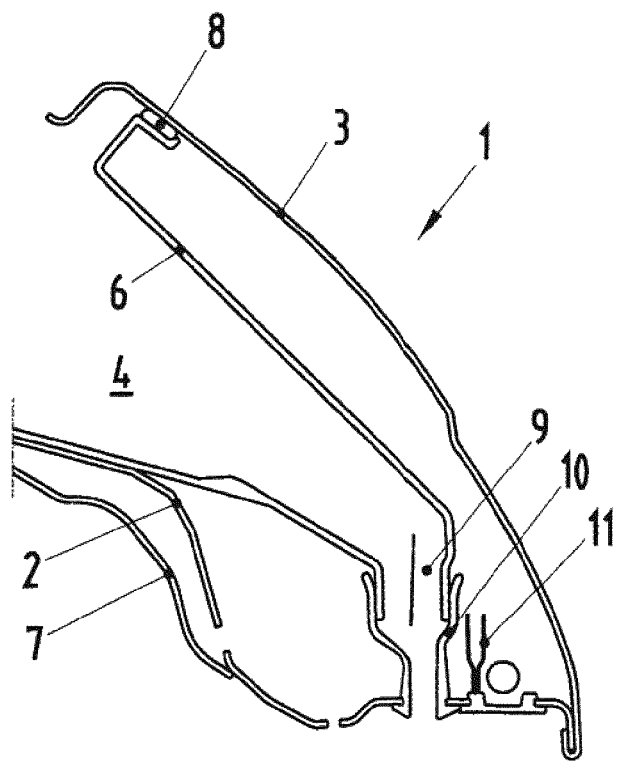
FIG. 2 is a diagrammatic, sectional view as in FIG. 1, but in a different section plane.

Considering FIG. 1 further, it can be seen that the collecting device 6, by its basin-like or trough-like configuration, causes water which has infiltrated into the stowage space 4 to be collected, and is simultaneously capable of discharging the collected water to an outflow 9 (see FIG. 2 and FIG. 6). Here, the outflow 9 projects into an outflow spout 10, as a result of which the collected water which is to be discharged can be discharged into the environment in front of a license plate lamp 11 in the direction of travel.

To permit a movement of the wind-deflecting device which is arranged in the stowage space 4 in its non-use position, an element 12 which drives the wind-deflecting device is provided, which element 12 projects into the stowage space 4 through a passage opening 13 in the region of the collecting device 6. To prevent an undesired outlet of water out of the stowage space 4 in the region of the passage opening 13, a rubber spout is provided which surrounds the drive element 12 and which bears sealingly with elastic lips against the element 12.

Figure 3:
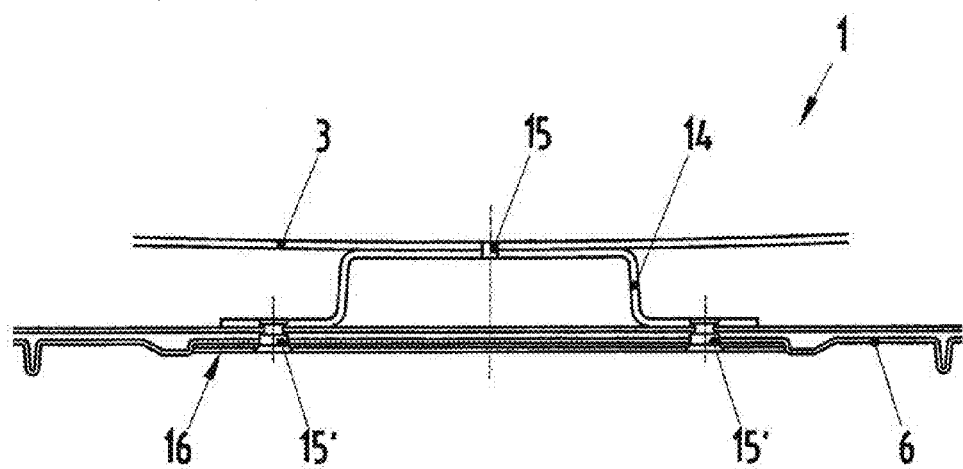
FIG. 3 is a diagrammatic, sectional view taken along the section plane III-III shown in FIG. 1.

Considering FIG. 3, it can be seen that the collecting device 6 is fixedly connected to the outer panel 3 in the region of a bracket 14, and is in particular riveted to the outer panel 3 by a rivet connection. Here, the bracket 14 may be of an angled configuration and may for example be riveted to the outer panel 3 by a solid punch rivet 15. At its arms, the bracket 14 is connected to the collecting device 6 for example by punch rivets 15', with a fixing element 16 which is situated opposite the bracket 14, for example a fixing panel, being provided in order to increase the rigidity of the punched connection. The connection of the collecting device 6 to the outer panel 3 by the bracket 14 permits pre-positioning of the collecting device 6 with respect to the outer panel 3, such that in a further working step, it is possible for the encircling and sealed adhesive bond 8 to be formed in a relatively simple manner in the form of an adhesive seam.

Figure 4:
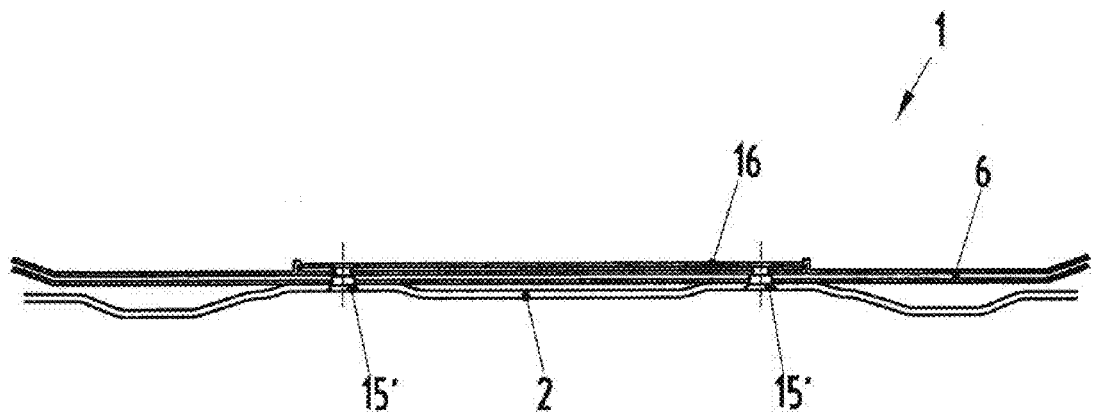
FIG. 4 is a diagrammatic, sectional view taken along the section plane IV-IV shown in FIG. 1.

A similar configuration to that shown in FIG. 3 is illustrated in FIG. 4, with a fixed connection between the collecting device 6 and the inner panel 2 by punch rivets 15' also being provided here. The punch rivet connection is stiffened here too by a fixing element 16'. Compared to screw connections, rivet connections have the great advantage that they form a non-detachable connection, in which an undesired detachment is prevented.

By the collecting device 6 according to the invention, it is therefore possible for the water which has infiltrated into the stowage space 4 to be collected, and discharged in a targeted fashion, in a simple manner and in such a way as to reduce a risk of corrosion, such that an undesired infiltration of water into points which are at particular risk of corrosion, for example into gaps and cracks, can be reliably prevented. As a result of the collecting device 6 conventionally being formed from plastic, the collecting device can firstly be produced in a particularly cost-effective manner and can secondly be adapted in a particularly simple, that is to say flexible, manner to any occurring changes. Furthermore, as a result of the specially selected adhesive bond 8, it is easily possible for the adhesive bond 8 to harden during a painting process during which relatively high temperatures conventionally occur, since the specially configured adhesive bond 8 can easily transmit the different thermal expansions with regard to the inner panel 2, the outer panel 3 and the collecting device 6.

The invention claimed is:

1. A tailgate of a motor vehicle, the tailgate comprising:
an extensible wind-deflecting device; an inner panel;
an outer panel; and
a collecting device connected to said inner and outer panels and defining a partial region of a stowage space, said collecting device being provided for collecting water which has infiltrated into said stowage space, said extensible wind-deflecting device which, in a non-use position, is disposed, so as to lie within said stowage space.

2. The tailgate according to claim 1, wherein said collecting device is formed from a material selected from the group consisting of plastics and metals.

3. The tailgate according to claim 1, wherein said collecting device is formed in a manner of a basin/trough and is sealingly adhesively bonded in an encircling fashion at least to said outer panel resulting in an adhesive bond.

4. The tailgate according to claim 3, wherein said adhesive bond ensures an elastically sealed connection between said collecting device and said outer panel at least in a temperature range from −40° C.<T<90° C.

5. The tailgate according to claim 1,
further comprising an outflow spout; and
wherein said collecting device has an outflow projecting into said outflow spout.

6. The tailgate according to claim 1, further comprising a bracket, said collecting device is fixedly connected to said outer panel in a region of said bracket.

7. The tailgate according to claim 1, further comprising at least one metallic retaining element disposed on said collecting device, by means of said retaining element, said collecting device is fixed to said inner panel.

8. The tailgate according to claim 1, wherein said collecting device has at least one passage opening formed therein for an element which drives the wind-deflecting device.

9. The tailgate according to claim 1, wherein said collecting device is formed from a material selected from the group consisting of high-temperature-resistant plastics, aluminum and pressure-die-cast magnesium.

10. The tailgate according to claim 6, further comprising a solid punch rivet, said collecting device is riveted by said solid punch rivet, to said outer panel in said region of said bracket.

11. The tailgate according to claim 7, wherein said metallic retaining element is a metallic band.

12. A motor vehicle, comprising:
a stowage space;
an extensible wind-deflecting device which, in a non-use position, is disposed, so as to lie within an outer contour, in said stowage space;
a tailgate, containing:
an inner panel;
an outer panel; and
a collecting device connected to said inner and outer panels and disposed in a region of said stowage space, said collecting device being provided for collecting water which has infiltrated into said stowage space.

13. The motor vehicle according to claim 12, wherein said collecting device is formed from a material selected from the group consisting of plastics and metals.

14. The motor vehicle according to claim 12, wherein said collecting device is formed in a manner of a basin/trough and is sealingly adhesively bonded in an encircling fashion at least to said outer panel resulting in an adhesive bond.

15. The motor vehicle according to claim 14, wherein said adhesive bond ensures an elastically sealed connection between said collecting device and said outer panel at least in a temperature range from −40° C.<T<90° C.

16. The motor vehicle according to claim 12,
further comprising an outflow spout; and
wherein said collecting device has an outflow projecting into said outflow spout.

17. The motor vehicle according to claim 12, further comprising a bracket, said collecting device is fixedly connected to said outer panel in a region of said bracket.

18. The motor vehicle according to claim 12, further comprising at least one metallic retaining element disposed on said collecting device, by means of said retaining element, said collecting device is fixed to said inner panel.

19. The motor vehicle according to claim 12, wherein said collecting device has at least one passage opening formed therein for an element which drives said wind-deflecting device.

20. The motor vehicle according to claim 12, wherein said collecting device is formed from a material selected from the group consisting of high-temperature-resistant plastics, aluminum and pressure-die-cast magnesium.

21. The motor vehicle according to claim 17, further comprising a solid punch rivet, said collecting device is riveted by said solid punch rivet, to said outer panel in said region of said bracket.

22. The motor vehicle according to claim 18, wherein said metallic retaining element is a metallic band.

* * * * *